United States Patent
Abedi

(10) Patent No.: US 6,387,273 B1
(45) Date of Patent: May 14, 2002

(54) SAMPLE PREPARATION FOR HIGH THROUGHPUT PURIFICATION

(75) Inventor: Jaleh Abedi, Raleigh, NC (US)

(73) Assignee: Scynexis Chemistry & Automation, Inc., Durham, NC (US)

( * ) Notice: Subject to any disclaimer, the term of this patent is extended or adjusted under 35 U.S.C. 154(b) by 0 days.

(21) Appl. No.: 09/645,348

(22) Filed: Aug. 25, 2000

Related U.S. Application Data

(60) Provisional application No. 60/150,995, filed on Aug. 27, 1999.

(51) Int. Cl.$^7$ .............................................. B01D 15/08
(52) U.S. Cl. ..................... 210/656; 210/659; 210/143; 210/198.2; 436/161
(58) Field of Search ................................ 210/635, 656, 210/659, 143, 198.2; 436/161

(56) References Cited

U.S. PATENT DOCUMENTS

| | | |
|---|---|---|
| 3,589,867 A | 6/1971 | Heinz et al. ............... 23/230 R |
| 3,680,967 A | 8/1972 | Engelhardt .................. 356/246 |
| 3,853,010 A | 12/1974 | Christen et al. .............. 73/423 |
| 4,798,095 A | 1/1989 | Itoh ........................ 73/863.01 |
| 4,835,707 A | 5/1989 | Amano et al. ............... 364/497 |
| 5,267,178 A | 11/1993 | Berner ....................... 364/498 |
| 5,273,715 A | 12/1993 | Bridgham et al. ............ 422/63 |
| 5,301,261 A | 4/1994 | Poole et al. .................... 395/82 |
| 5,324,483 A | 6/1994 | Cody et al. ................. 422/131 |
| 5,434,971 A | 7/1995 | Lysakowski, Jr. ........... 395/200 |
| 5,463,564 A | 10/1995 | Agrafiotis et al. .......... 364/497 |
| 5,489,678 A | 2/1996 | Fodor et al. ................ 536/22.1 |
| 5,506,805 A | 4/1996 | Sugarman et al. .......... 422/131 |
| 5,525,464 A | 6/1996 | Drmanac et al. ............... 435/6 |
| 5,527,681 A | 6/1996 | Holmes .......................... 435/6 |
| 5,541,061 A | 7/1996 | Fodor et al. .................... 435/6 |
| 5,545,531 A | 8/1996 | Rava et al. ..................... 435/6 |
| 5,547,839 A | 8/1996 | Dower et al. ................... 435/6 |
| 5,552,270 A | 9/1996 | Khrapko et al. ................ 435/6 |
| 5,556,762 A | 9/1996 | Pinilla et al. .............. 435/7.21 |
| 5,574,656 A | 11/1996 | Agrafiotis et al. .......... 364/500 |
| 5,595,664 A | 1/1997 | Sanford et al. .............. 210/656 |
| 5,609,826 A | 3/1997 | Cargill et al. .................. 422/99 |
| 5,639,603 A | 6/1997 | Dower et al. ................... 435/6 |
| 5,641,634 A | 6/1997 | Mandecki ....................... 435/6 |
| 5,658,799 A | 8/1997 | Choperena et al. ........... 436/50 |
| 5,670,054 A | 9/1997 | Kibbey et al. ............... 210/656 |
| 5,679,773 A | 10/1997 | Holmes ....................... 530/334 |
| 5,684,711 A | 11/1997 | Agrafiotis et al. .......... 364/500 |
| 5,690,893 A | 11/1997 | Ozawa et al. ................. 422/67 |
| 5,693,292 A | 12/1997 | Choperena et al. ........... 422/67 |
| 5,708,153 A | 1/1998 | Dower et al. ................ 536/22.1 |
| 5,712,171 A | 1/1998 | Zambias et al. ............. 436/518 |
| 5,736,412 A | 4/1998 | Zambias et al. ............. 436/518 |
| 5,741,462 A | 4/1998 | Nova et al. .................. 422/68.1 |
| 5,757,659 A | 5/1998 | Arai et al. ................... 364/497 |
| 5,766,481 A | 6/1998 | Zambias et al. ............. 210/656 |
| 5,772,962 A | 6/1998 | Uchida et al. ................. 422/67 |
| 5,798,035 A | 8/1998 | Kirk et al. ................... 205/335 |
| 5,807,754 A | 9/1998 | Zambias et al. ............. 436/518 |
| 5,862,514 A | 1/1999 | Huse et al. ..................... 702/22 |
| 5,874,214 A | 2/1999 | Nova et al. ...................... 435/6 |
| 5,901,069 A | 5/1999 | Agrafiotis et al. ....... 364/528.03 |
| 5,925,562 A | 7/1999 | Nova et al. ................ 435/287.1 |
| 5,938,932 A | 8/1999 | Connelly et al. ............ 210/659 |
| 5,942,387 A | 8/1999 | Hollinshead .................... 435/5 |
| 5,948,360 A | 9/1999 | Rao et al. ....................... 422/65 |
| 5,993,662 A | 11/1999 | Garr et al. ................... 210/656 |

FOREIGN PATENT DOCUMENTS

| | | | |
|---|---|---|---|
| DE | 196 05 814 | 8/1997 | ................. 210/656 |
| EP | 08 82500 | 12/1998 | ................. 210/656 |
| EP | 0 903 176 | 3/1999 | ................. 210/656 |
| FR | 2 760 843 | 9/1998 | ................. 210/656 |
| WO | 95 1559 | 1/1995 | ................. 210/656 |
| WO | 96 05488 | 2/1996 | ................. 210/656 |

OTHER PUBLICATIONS

Bishop, C.A., et al., "The Preparative Separation of Synthetic Peptides on Reversed–Phase Silica Packed in Radially Compressed Flexible–Walled Columns," *J. Liquid Chromatography*, 4(4): 661–680, 1981.

Bishop, C.A., et al., "High Performance Liquid Chromatography of Amino Acids, Peptides and Proteins XXI. The application of preparative reversed–phase high–performance liquid chromatography for the purification of a synthetic underivatised peptide," *Journal of Chromatography*, 192: 222–227,1980.

Brenner, S., et al., "Encoded combinatorial chemistry", *Proc, Nat'l. Acad, Sci. USA*, 89: 5381–5383, 1992.

DeWitt, S. H., et al., "Combinatorial Organic Synthesis Using Parke–Davis's DIVERSOMER Method",*Acc. Chem. Res.*, 29(3): 114–122, 1996.

(List continued on next page.)

*Primary Examiner*—Ernest G. Therkorn
(74) *Attorney, Agent, or Firm*—Burns, Doane, Swecker & Mathis, L.L.P.

(57) ABSTRACT

An HPLC method for purifying and/or characterizing large numbers of related compounds, for example, combinatorial and lead generation libraries, is disclosed. The compounds are purified on a semi-preparative or preparative scale without having to first remove the solvent from the vessel in which the compounds were prepared. This can be accomplished by equilibrating the HPLC column with a first mobile phase such that, when the sample is added to the column in the solvent in which it is prepared, the sample does not significantly elute off of the column in the void volume, and the solvent in which the compound is prepared does elute off of the column in the void volume or shortly thereafter. In addition, the solvent power can be adjusted such that the mobile phase is not a strong solvent for the compound of interest. The size of the void volume can also be decreased, for example, using a relatively short column and asorbent with a particle size of about 5 microns or less, with suitable inlet and outlet tubing to handle the increased pressure. The column can be saturated with a weak solvent prior to sample injection, for example, by increasing the flow rate of a mobile phase through the HPLC column.

8 Claims, No Drawings

OTHER PUBLICATIONS

Griffey, R. H., et al., "Rapid Deconvolution of combinatorial Libraries using HPLC Fractionation", *Tetrahedron, NL, Elsevier Sci. Pub.*, 54(16): 4067–4076, 1998.

Harris, S., et al., "High Throughput Analysis & Purification: The new Paradigm", *MDS Panlabs*, 1–13, 1998.

Josses, P, et al., "Carrying out Multiple Reactions in Organic Synthesis with a Robot", *Advances in Laboratory Automation Robotics*, 5: 463–475, 1990.

Kaliszan, R., et al., "Quantitative Structure–Chromatographic Retention Relationships", *Chemical Analysis*, 91: 234–278 (Chapter 11), Wiley and Sons, New York, 1987.

Kibbey, C. E., "An Automated System for the Purification of Combinatorial libraries by Preparative LC/MS", *Laboratory Robotics and Automation*, 9: 309–321, 1997.

Knighton, D. R., et al., "Facile, Semi–Preparative, High–Performance Liquid Chromatographic Separation of Synthetic Peptides Using Ammonium Bicarbonate Buffers," *Journal of Chromatography*, 249:193–198, 1982.

Lindsey, J. S., "A retrospective on the automation of laboratory synthetic chemistry", *Laboratory Automation & Information Management*, 17(1): 15–45, 1992.

Mirrlees, M.S., et al., "Direct Measurement of Octanol–Water Partition Coefficients by High–Pressure Liquid Chromatography," *J. Med. Chem.*, 19(5): 615–619, 1976.

Rotstein, S., et al., "GroupBuild: A Fragment–Based Method for De Novo Drug Design". *J. Med. Chem.*, 36: 1700–1710, 1993.

Rudge, D. A., "The automation of solution phase synthetic chemistry using XP Zymate™ laboratory robotic systems", *Laboratory Automation & Information Management*, 33(2): 81–86, 1997.

Schultz, L., et al., "High Throughput Purification of Combinatorial Libraries", *Bio & Med. Chem. Ltrs.*, 8: 2409–2414, 1998.

Testa, B., "The Concept of Molecular Structure in Structure–Activity Relationship Studies and Drug Design", *Med. Res. Rev.*, 11 (1): 38–48, 1991.

"Techniques and Experiments for Organic Chemistry", 2nd Edition, 56–60, 1977.

Weller, H. N., et al., "High throughput analysis and purification in support of automated parallel synthesis", *Molecular Diversity*, 6: 61–70, 1997.

C.H. LOCHMÜLLER and THOMAS J. WENZEL, Chapter 2 "Liquid Chromatography", Physical Methods of Chemistry, 2nd Ed., vol. X, Supplement and Cumulative Index, 1993, pp. 85–162, John Wiley & Sons, Inc., New York.

"Process Scale Liquid Chromotography" edited by G. SUBRAMANIAN, 1995, pp. 203–213, VCH Publishers, New York, New York.

Kirk–Othmer Encyclopedia of Chemical Technology, Fourth Edition, vol. 6, 1993, pp. 207–224, John Wiley & Sons, Inc. New York.

Ullman's Encyclopedia of Industrial Chemistry, Fifth Edition, vol. A19, 1995, pp. 168–169, VCH Publishers, New York, New York.

Ullman's Encyclopedia of Industrial Chemistry, Fifth Edition, vol. A18, 1992, p. 19, VCH Publishers, New York, New York.

Ullman's Encyclopedia of Industrial Chemistry, Fifth Edition, vol. A9, 1988, pp. 118–119, VCH Publishers, New York, New York.

SAMPLE PREPARATION FOR HIGH THROUGHPUT PURIFICATION

This application claim s priority under 35 U.S.C. §§119 and/or 365 to U. S. Provisional Application No. 60/150995 filed in the United States on Aug. 27, 1999; the entire content of which is hereby incorporated by reference.

FIELD OF THE INVENTION

The present invention generally relates to the purification and/or characterization of libraries of compounds, for example, combinatorial and/or lead generation libraries.

BACKGROUND OF THE INVENTION

Currently, there are many general methods of purifying synthetic compounds. These methods generally involve purifying a single target compound from multiple impurities.

Compounds are currently being prepared in relatively large numbers in combinatorial and lead generation libraries. Often, compounds are synthesized in multi-well plates or multi-tube arrays, with the number of related compounds numbering in the thousands. The compounds are then typically purified using HPLC.

Combinatorial libraries are synthesized using a variety of solvents and solvent mixtures. It is difficult to perform high performance liquid chromatography (HPLC) on samples prepared in multi-tube arrays without first removing the solvents, because the solvents often cause the compounds to elute in the void volume of the column. Additionally, use of the solvents can cause compounds to precipitate on the column head or injector or transfer lines, which can lead to plugging the inlet, increasing the column back pressure, and restricting the flow through the column. Further, to the extent that it may be desirable to use a single gradient for purifying compounds on an HPLC column, it is difficult, if not impossible, to define a standard protocol when the solvents used to prepare the compounds can vary from compound to compound.

Because of these limitations, the solvents used for the synthesis are typically removed prior to purifying the compounds, and the compounds are then re-dissolved in a second solvent system prior to adding the compound to the HPLC column. Choice of the proper solvent for dissolving the sample is a special problem in preparative HPLC, because the goal is to inject a relatively large amount of sample into a preparative HPLC column without having the sample precipitate in the column. While this method works, it adds two time consuming steps—removing a first solvent, and adding a second solvent.

It would be advantageous to have methods for purifying compounds on an HPLC column without having to remove the solvent prior to placing the compounds on the HPLC column. The present invention provides such methods.

SUMMARY OF THE INVENTION

Methods for purifying and/or characterizing compounds, particularly libraries of compounds such as combinatorial or lead generation libraries, are disclosed. Purification devices capable of being used in the method are also disclosed.

Compounds are commonly synthesized via combinatorial chemistry, typically in multi-tube racks. The amount of solvent in each of the test tubes in the racks is typically less than about 2 mL. The methods described herein permit one to purify compounds directly from the vessel in which they are prepared without first removing the solvent used to prepare the compound.

The methods involve equilibrating the HPLC column with a first mobile phase such that, when the sample is added to the column in the solvent in which it is prepared, the sample does not significantly elute off of the column in the void volume, and the solvent in which the compound is prepared does elute off of the column in the void volume or shortly thereafter. Then, after the solvent has eluted, an appropriate purification protocol can be used to purify the compound, for example, using gradient elution.

There are several parameters which can be varied to arrive at a mobile phase such that the compound of interest does not significantly elute in the void volume or cause blockage in the system. First, the solvent power can be adjusted such that the mobile phase is not a strong solvent for the compound of interest. For example, when a reverse phase column is used, the type of compounds which most rapidly elute off the column are polar organic compounds. When the compounds are organic compounds, water is a reasonable solvent for use in the mobile phase. However, the water preferably includes a minor amount (preferably between 1 and 10 percent v/v, more preferably between 2 and 6 percent, most preferably between 3 and 5 percent) of a water-miscible organic solvent.

A second way to avoid having the compound of interest elute in the void volume or cause blockage in the system is to decrease the size of the void volume, having first ensured that the mobile phase in the void volume is not a strong solvent for the compound of interest. The void volume can be decreased, for example, by using a relatively short column and asorbent with a particle size of about 5 microns or less, with suitable inlet and outlet tubing. Typically, HPLC is conducted using devices in which the tubing has an internal diameter of about 0.01 inches. The tubing used in the methods described herein preferably has an internal diameter between 0.01 and 0.04, and more preferably, between about 0.02 and 0.03 inches. This allows the column to have significantly less back pressure and less chance of blockage caused by precipitation of compounds in the column inlet and outlet while using a different sample solvent than the mobile phase.

A third way to avoid having the compound of interest elute in the void volume or cause blockage in the system is to saturate the column with a weak solvent prior to sample injection, for example, by increasing the flow rate of a mobile phase which is a weak solvent for the compound of interest through the HPLC column. Next, one can apply a suitable solvent gradient system until the solvent used to prepare the compound of interest has eluted off the column, while retaining the compounds of interest on the column.

A fourth way to avoid having the compound of interest elute in the void volume or cause blockage in the system is to inject samples in a relatively large volume of lower concentration rather than as a relatively small volume of a higher concentration.

A fifth way to avoid having the compound of interest elute in the void volume or cause blockage in the system is to decrease the particle size of the column packing (sorbent) while using a relatively short and relatively fat column with suitable inlet and outlet tubing sizes to handle the increased pressures.

Preparative HPLC is commonly performed using a sorbent particle size of about 10 $\mu$m or larger with a long column. Preferably, the methods herein use a sorbent with a particle size of about 5 microns or less, more preferably with a relatively short column (for example, 50 mm or less).

The methods herein can use one or more of the above, in any suitable combination, to minimize elution of the compound of interest in the void volume or precipitation of the compound in the HPLC system. Preferably, the solvent used to prepare the compound is a water-miscible organic solvent. If it is not, use of a co-solvent is preferred. Co-solvents are organic solvents which are water-miscible, and can cause the non-water-miscible solvent to become miscible in the water. The amount of sample volume which can be applied to a typical preparative HPLC column is an important but imperfectly understood operation. Normally samples should be injected in the form of a relatively large volume at a lower concentration rather than in the form of a smaller volume at a higher concentration. The amount of sample volumes which can be applied to a typical preparative HPLC column is about 2 mL or less.

In order to determine an appropriate set of conditions for purification a combinatorial library, one can perform route scouting on the library to determine which set of conditions described above is appropriate for allowing the solvent used to prepare the compound(s) to elute off the column in the void volume or shortly thereafter while the compound(s) of interest does not significantly elute off the column in the void volume or cause blockage in the system.

DETAILED DESCRIPTION

Methods for purifying and/or characterizing compounds, particularly libraries of compounds such as combinatorial or lead generation libraries, are disclosed. Purification devices capable of being used in the method are also disclosed.

The method involves equilibrating an HPLC column with a mobile phase that when combined with the solvent used in the synthesis, results in a combined solvent system which has an appropriate solvent strength such that the compound of interest does not elute off of the column before the solvent used in the synthesis elutes off of the column, for example, in the void volume or shortly thereafter. The combined solvent system also allows one to avoid causing a blockage in the system due to precipitation of the compound of interest in the column. After the solvent used to prepare the compound of interest has eluted off of the column, a suitable solvent system, for example, a gradient solvent system, can be used to elute the compound of interest from the column.

DEFINITIONS

As used herein, the term "preparative HPLC" and like terms is meant an HPLC system which is capable of producing high (500 or more) microgram, milligram, or gram sized product fractions. The term "preparative" includes both preparative and semi-preparative columns, but is not intended to include analytical columns, which provide fractions in the nanogram to low $\mu$g range.

As used herein, the term "mechanically actuatable" when referring to a switching valve is meant a valve whose different positions are selected by other than manual actuation, i.e., by computer selection. The actual mechanical actuation may be electric (i.e. a solenoid controlled valve), pneumatic (i.e. an air pressure controlled valve), hydraulic (a liquid pressure controlled valve), or any other equivalent means.

As used herein, an "HPLC compatible detector" is a detector suitable for use in an HPLC system which is capable of providing a detectable signal upon elution of a compound peak. For example, a detector capable of generating a signal when a compound elutes from the compound is an HPLC compatible detector. Where component absorbance varies widely, it may be necessary to utilize more than one detector. A detector capable of detecting a desired component is not an "incompatible" detector due to its inability to detect a non-desired peak.

A "waste reservoir" is a destination suitable for collecting eluate that does not include the compound of interest, for example, the solvent used to regenerate the column between runs or the eluate driven off the column before and after the compound of interest has eluted. Suitable waste reservoirs include flasks, bottles, or jugs.

As used herein, a strong solvent is one in which the compound of interest is soluble at a concentration of at least about one gram/liter, and a weak solvent is one in which the compound of interest is soluble at a concentration of less than about one gram/liter.

Compound Synthesis

Compounds are commonly synthesized via combinatorial chemistry, typically in multi-tube racks. The amount of solvent in each of the test tubes in the racks is typically (and preferably) less than about 2 mL. The methods described herein permit one to purify compounds directly from the vessel in which they are prepared without first removing the solvent used to prepare the compound.

The methods described herein are compatible with virtually any water-miscible organic solvent used to prepare the compounds. Examples of solvents and solvent systems which have been successfully used with the methods include ethanol, ethyl acetate, pyridine, acetone, dichloromethane (alone and in combination with other solvents such as ethanol, toluene, benzene and pyridine), dimethyl sulfoxide, dimethyl formamide, glymes, Methanol, Isopropanol, and Acetonitrile, THF and any other solvent or solvents compatible with material of construction of the system. If the solvents used to prepare the compounds are not water-miscible, then co-solvents can be used (such as water-miscible organic solvents) such that the combination of solvents is water-miscible.

Types of Compounds which can be Purified

Virtually any organic compound which is capable of being eluted on an HPLC column can be purified according to the methods described herein. Preferably, the compounds to be purified are part of a library of compounds, more preferably, a lead generation or combinatorial library of compounds. The purity capable of being obtained using the method is typically greater than 90%, and is preferably greater than 95%.

The term "library" refers to at least 3, preferably from $10^2$ to 109 and more preferably from 102 to 104 compounds. Preferably, these compounds are prepared as a multiplicity of compounds in a single solution or reaction mixture which permits facile synthesis thereof. Each member of the library of compounds can be isolated and, optionally, characterized.

Typically, the compounds have a core structure which can be modified at least one position, preferably two or more positions, with a variety of different functional groups, in order to generate a library, for example, a combinatorial or lead optimization library of compounds.

Typical core structures are linear, branched or cyclic organic compounds that include at least three carbon atoms and at least one, and preferably at least two sites capable of undergoing a reaction to change the structure, usually by the addition of other molecules to the reactive site.

Examples of families of insecticides include 1-aryl pyrazoles, pyrroles, pyrrolidones, and nicotinic acid derivatives. However, ligand compounds which may bind to the appropriate binding site may be, for example, steroids, hormones, peptides, proteins, oligonucleotides, oligoribonucleotides, enzymes, and the like.

Suitable core structures include, but are not limited to: peptides, proteins, oligonucleotides, oligoribonucleotides, oligosaccharides, alkaloids, quinolines, isoquinolines, benzimidazoles, benzothiazoles, purines, pyrimidines, thiazolidines, imidazopyrazinones, oxazolopyridines, pyrroles, pyrrolidines, imidazolidones, guinolones, amino acids, macrolides, penems, saccharides, xanthins, benzothiadiazine, anthracyclines, dibenzocycloheptadienes, inositols, porphyrins, corinns, and carboskeletons presenting geometric solids (e.g., dodecahedrane). The core structures can be derived from naturally occurring compounds, or can include non-natural modifications (i.e., non-naturally occurring amino acids and nucleotides).

Suitable modifications for the core structures include:

1) amino acid derivatives, which include, for example, natural and synthetic amino acid residues including all of the naturally occurring alpha amino acids, species having derivatives, variants or mimetics of the naturally occurring side chains; N-substituted glycine residues; natural and synthetic species known to functionally mimic amino acid residues, such as station, bestatin, etc.

2) nucleotide derivatives, which includes natural and synthetic nucleotides, such as adenosine, thymine, guanidine, uridine, cytosine, derivatives of these and variants and mimetics of the purine ring, the sugar ring, the phosphate linkage and combinations of some or all of these. Nucleotide probes (between 2 and 25 nucleotides) and oligonucleotides (more than 25 nucleotides) including all of the various possible structural modifications; homo and hetero-synthetic combinations and permutations of the naturally occurring nucleotides; derivatives and variants containing synthetic purine or pyrimidine species, or mimics of these; various sugar ring mimetics; and a wide variety of alternate backbone analogs, including but not limited to phosphodiester, phosphorothionate, phosphorodithionate, phosphoramidate, alkyl phosphotriester, sulfamate, 3'-thioformacetal, methylene(methylimino), 3-N-carbamate, morpholino carbamate and peptide nucleic acid analogs.

3) a carbohydrate derivative, which would include natural physiologically active carbohydrates; related compounds, such as glucose, galactose, sialic acids, beta -D-glucosylamine and nojorimycin, which are both inhibitors of glucosidase; pseudo sugars, such as 5a-carba-2-D-galactopyranose, which is known to inhibit the growth of Klebsiella pneumonia (n=1); synthetic carbohydrate residues and derivatives of these (n=1) and all of the complex oligomeric permutations of these as found in nature, including high mannose oligosaccharides, the known antibiotic streptomycin (n>1).

4) a naturally occurring or synthetic organic structural motif. The term "motif" is defined as an organic molecule having or containing a specific structure that has biological activity, such as a molecule having a complementary structure to an enzyme active site, for example. This term includes any of the well known basic structures of pharmaceutical compounds including pharmacophores, or metabolites thereof. These basic structures include beta-lactams, such as penicillin, known to inhibit bacterial cell wall biosynthesis; dibenzazepines, known to bind to CNS receptors and used as antidepressants; polyketide macrolides, known to bind to bacterial ribosymes, etc. These structural motifs are generally known to have specific desirable binding properties to ligand acceptors.

5) a reporter element, such as a natural or synthetic dye or a residue capable of photographic amplification which possesses reactive groups that may be synthetically incorporated into the sulfaminimide structure or reaction scheme, and may be attached through the groups without adversely interfering or affecting with the reporting functionality of the group. Preferred reactive groups are amino, thio, hydroxy, carboxylic acid, carboxylic acid ester, particularly methyl ester, acid chloride, isocyanate alkyl halides, aryl halides and oxirane groups.

6) an organic moiety containing a polymerizable group such as a double bond, or other functionalities capable of undergoing condensation polymerization or copolymerization. Suitable groups include vinyl groups, oxirane groups, carboxylic acids, acid chlorides, esters, amides, azlactones, lactones and lactams. Other organic moiety such as those defined for R and R' may also be used.

7) a macromolecular component, such as a macromolecular surface or structures which may be attached to the sulfaminimide modules via the various reactive groups outlined above, in a manner where the binding of the attached species to a ligand-receptor molecule is not adversely affected and the interactive activity of the attached functionality is determined or limited by the macromolecule. Examples of macromolecular components include porous and non-porous inorganic components, such as, for example, silica, alumina, zirconia, titania and the like, as commonly used for various applications, such as normal and reverse phase chromatographic separations, water purification, pigments for paints, etc.; porous and non-porous organic macromolecular components, including synthetic components such as styrenedivinyl benzene beads, various methacrylate beads, PVA beads, and the like, commonly used for protein purification, water softening; and a variety of other applications, natural components such as native and functionalized celluloses, such as, for example, agarose and chitin, sheet and hollow fiber membranes made from nylon, polyether sulfone or any of the materials mentioned above. The molecular weight of these macromolecules may range from about 1000 Daltons to as high as possible (less than or equal 2000 Daltones for our method.) They may take the form of nano-particles (dp=1000–5000 Angstroms), latex particles (dp=1000–5000 Angstroms), porous or non-porous beads (dp=0.5–1000 microns), membranes, gels, macroscopic surfaces or functionalized or coated versions or composites.

Suitable chemical modifications also include chemical bonds to a suitable organic moiety, a radioactive moiety, a hydrogen atom, an organic moiety which contains a suitable electrophilic group, such as an aldehyde, ester, alkyl halide, ketone, nitrile, epoxide or the like; a suitable nucleophilic group, such as a hydroxyl, amino, carboxylate, amide, carbanion, urea or the like; or one of the other structural diversity elements defined below. In addition, the chemical modifications can be in the form of a ring, bi-cyclic or tri-cyclic ring system; or structure which connects to the ends of the repeating unit of the compound defined by the preceding formula; or may be separately connected to other moieties.

The modifications can be the same or different and each may be one or more atoms of carbon, nitrogen, sulfur, oxygen, any other inorganic elements or combinations thereof. For example, the core structure can be modified with cyano, nitro, halogen, oxygen, hydroxy, alkoxy, thio, straight or branched chain alkyl, carbocyclic aryl and substituted or heterocyclic derivatives thereof. The modifications can be in different in adjacent molecular cores and have a selected stereochemical arrangement about the carbon atom to which they are attached.

The compounds can be laid out in a logical fashion in multi-tube arrays or multi-well plates, in the form of arrays of chemical compounds. Preferably, the compounds all have a central core structure, and have various modifications which permit the identification of structure-activity relationships with which to determine optimum compounds for a particular use.

The array can be ordered in such a fashion as to expedite synthesis, purification, and evaluation, to maximize the informational content obtained from the testing and to facilitate the rapid evaluation of that data.

The arrays can be constructed from logically ordered and arranged sub-arrays of compounds. Sub-arrays can be prepared which include spatially addressable sets of structurally related individual chemical compounds, with a common structure and a variable modification of the structure. Sub-arrays are particular useful when multiple positions on the structure are modified, and the variation between any two compounds within a given sub-array can include, for example, zero (0) or one (1) change in a structure.

These sub-arrays and arrays can be organized to form higher order arrays that include sets of arrays, and can be evaluated as a higher order array to provide information regarding the optimum structural features for the common core structure of interest.

The sub-arrays can be arranged in such a manner that the direct comparisons of compounds automatically yields information regarding the effect known fragments have on a desired application, as well as on the effect on changes in physical and reactive properties. As provided by simple set theory for any number of independently variable structural diversity elements n, there exists n logical higher order array arrangements, such that relational information on the effect of variation of each of the n structural diversity elements can be obtained in a similar manner by comparison of testing data from the relative addresses in appropriately arranged sub-arrays.

By screening all possible synthetic variations of a core molecule, the selection of the optimal candidate is more a function of the data collection method than the "rational" basis for selecting the compound. The desired physical and chemical properties, i.e., binding affinity and bioactivity, can be rapidly optimized, and directly correlated with the structural changes within a particular array or sub-array.

Because the spatial address of each compound within a multi-tube rack is known, the arrays can be tested to generate complete relational structural information such that a positive result provides: (1) information on a compound within any given spatial address; (2) simultaneous juxtaposition of this information upon a set of systematically structural congeners; (3) the ability to extract relational structural information from negative results in the presence of positive results.

HPLC Devices

Displacement chromatography (an example of which is HPLC) is based on the principle that in a sample the balance between stationary phase (SP) and mobile phase (MP) is shifted the direction of SP. Single components of a sample displace each other like a train and the displacing agent with the greater affinity to SP pushes this train by fractions out of the column. Gas chromatography, liquid chromatography and HPLC chromatography are some of the most well known examples of displacement chromatography.

An HPLC device typically includes at least the following components: a column, packed with a suitable stationary phase, a mobile phase, a pump for forcing the mobile phase through the column under pressure, and a detector for detecting the presence of compounds eluting off of the column. The devices can optionally include a means for providing for gradient elution, although such is not necessary using the methods described herein.

Routine methods and apparatus for carrying out HPLC separations are well known in the art, and are described, for example, in the following references: *J. Chromatography*, 192:222–227 (1980), *J. Liquid Chromatography* 4:661–680 (1981), and *J.Chromatography*, 249:193–198 (1982).

Suitable stationary phases are those in which the compound of interest elutes. Preferred columns are reverse phase columns, which may be natural (silica gel with alkyl chains of different lengths) or a synthetic crosslinked polymer (consisting of styrene and divinylbenzene). The particle size of the stationary phase is within the range from a few $\mu$m to several 100 $\mu$m, although the size is preferably 5 $\mu$m or less. The most preferred stationary phase is a $C_{18}$ column.

Suitable detection devices include mass spectrometers and UV detectors, and also include ELSD and DAD. The methods described herein use these detectors to determine when sample is eluting and when solvent alone is eluting.

The methods described herein often require the use of pressures up to about 2500 psi, which tend to be higher than those used in normal operating conditions for standard preparative HPLC. The actual pressure in the column depends on a variety of factors, such as the dimensions of the column, sorbent particle size, and column inlet and outlet tubing diameters. The methods also often require the use of relatively short (less than or equal to 5 cm) and relatively fat columns (diameters of about 2 cm or more) with sorbents with a relatively small particle size (for example, less than or equal to about 5 microns), relatively high flow rates of mobile phase, and relatively short run times (for example, up to 50 ml/min in 5 minutes), as compared to standard preparative HPLC (for example, less than about 20 ml/min in 30 minutes for a relatively long column with a sorbent with a relatively large (i.e., about 10 microns or more) particle size). This can be accomplished by, for example, using tubing with a larger than normal internal diameter (for example, between 0.01 and 0.04 inches in diameter) and adjusting the recirculation pump accordingly.

Methods of Preparing Samples

The method includes the following steps:
1. selecting an appropriate mobile phase such that when the void volume of the mobile phase is combined with the amount of solvent in the vessel used to prepare the compound of interest, the resulting solvent system does not cause the compound of interest to significantly elute off of the column,
2. conditioning the column with a selected mobile phase,
3. applying the compound dissolved in the solvent used to prepare the compound to the column,
4. eluting the solvent used to prepare the compound of interest from the column, 5. applying a second mobile phase or a gradient mobile phase to the column to displace the organic compound out of the column and collecting the fractions, and, optionally
6. analyzing the fractions by analytical HPLC and combining the fractions according to their quality,
7. removing the mobile phase, and
8. regeneration-washing the column, for example, with a mixture of alcohol-water, to elute the mobile phase and any remaining impurities.

To more rapidly purify compounds, the HPLC can include two columns, one of which purifies compounds while the other is being cleaned and regenerated. This step removes the chromatographic equilibration downtime.

After the solvent in which the compound has eluted, an appropriate purification protocol can be used to purify the compound, for example, using gradient elution.

In addition to selecting an appropriate mobile phase, there are several parameters which can be varied to arrive at a mobile phase such that the compound of interest does not significantly elute in the void volume or causing blockage in the system.

Adjusting Solvent Power

The solvent power can be adjusted such that the mobile phase is not a strong solvent for the compound of interest. Since the compounds eluted off of the column are organic compounds, and are typically polar organic compounds, water is a reasonable solvent fQr use in the mobile phase. However, the water preferably includes a minor amount (preferably between 1 and 10 percent v/v, more preferably between 2 and 6 percent, most preferably between 3 and 5 percent) of a water-miscible organic solvent. A preferred solvent system is 95% water/5% methanol, v/v. However, the amount of methanol can be adjusted depending on the polarity of the compounds of interest, and other water-miscible organic solvents, such as ethanol, acetonitrile, and the like, can be substituted for methanol.

Suitable water-miscible organic solvents include alcohols such as methanol, ethanol and isopropyl alcohol, acetonitrile, tetrahydrofuran (to the extent it does not significantly dissolve the tubing used in the HPLC), acetone, methyl ethyl ketone, and the like.

Decreasing the loss of compounds in the Void Volume

The methods allow one to minimize the loss of compounds in the void volume, relative to the amount of compound lost in the void volume using a standard HPLC protocol, when the solvent used to prepare the compounds is not removed before placing the compounds on the column. The mobile phase used to condition the column must not be a strong solvent for the compound of interest. If the mobile phase were a strong solvent for the compound of interest, then it would carry the compound through the column in the void volume, adding to the effect of the solvent used to prepare the compound, rather than negating the effect.

Using a relatively short column with a sorbent with a relatively small particle size, coupled with using a relatively large inlet and outlet flow rate, has the effect of lowering the overall solvent power of the mobile phase and increasing the retention of the compound on the column. The void volume can be decreased, for example, by using a shorter column. When using a sorbent with a relatively small particle size, the column back pressure increases. Preferably, to compensate for the increased pressure, one can use inlet and outlet column tubing with a relatively large diameter.

The tubing used in the methods described herein preferably has an internal diameter between 0.01 and 0.04, and more preferably, between about 0.02 and 0.03 inches. This allows the column to have significantly more void volume than standard HPLCs (which use tubing with an internal diameter of about 0.01 inches).

Increasing the Flow Rate of the Mobile Phase

The flow rate of the mobile phase through the HPLC column can be increased until the column becomes saturated with the mobile phase (a weak solvent for the compound of interest) before the compound of interest is added to the column. Then, a suitable solvent gradient system can be applied to the column to elute off the solvent used to prepare the compound in the void volume or shortly thereafter while retaining the compound of interest on the column. This has the effect of flooding the column with a mobile phase which is a weak solvent for the compound of interest, and helps avoid having the compound of interest elute in the void volume or cause a blockage in the system.

Suitable flow rates for use in the methods described herein range from about 15 to 50 ml/min, depending on the polarity of the compound(s) eluted off of the column, the column packing, the mobile phase, and other relevant factors. Using the teachings herein, those of skill in the art can select an appropriate flow rate. Generally speaking, the flow rate should increase with the polarity of the compound(s) eluted from the column.

Decreasing the Particle Size of the Sorbent

One can decrease the particle size of sorbent and length of the column in order to avoid having the compound of interest elute in the void volume. Compounds tend to have a higher affinity for smaller particle size sorbents, and accordingly, this can assist in keeping the compound from eluting while the solvent in which the compound is prepared elutes. Another advantage of using sorbents with a relatively small size is that the purity of the compound of interest is typically higher than when relatively larger particle size sorbents are used.

HPLC is commonly performed using a sorbent particle size of about 10 microns or larger. Preferably, the methods herein use a sorbent with a particle size of about 5 microns or less.

Combinations of the Above

The methods herein can use one or more of the above, in any suitable combination, to minimize elution of the compound of interest in the void volume or precipitation of the compound in the HPLC, which results in blockage of the HPLC system. Preferably, the particle size of the sorbent is kept relatively small, the diameter of the column tubing is kept relatively high, and the flow rate of the weak mobile phase (for example water with 1 to 5% methanol) to saturate the column before sample introduction is kept relatively high.

Preferably, the solvent used to prepare the compound is a water-miscible organic solvent. If it is not, use of a co-solvent is preferred. Co-solvents are organic solvents which are water-miscible, and can cause the non-water-miscible solvent to become miscible in the water. The amount of sample volume which can be applied to a typical preparative HPLC column for combinatorial library is about 2 mL or less.

Several syntheses involve using solid materials, for example, solid catalysts. An in-line filter can be used to remove the solid materials from the solvent system before the reaction mixture is added to the HPLC column.

After the solvent used to prepare the compound has been eluted, the compound of interest can be obtained using-routine HPLC methods, for example, using a gradient elution protocol.

Route Scouting for Combinatorial Libraries

Libraries of compounds are commonly synthesized using combinatorial chemistry approaches, typically in multi-tube racks. Structurally similar compounds, such as those in combinatorial and lead generation libraries, are often prepared using similar solvent systems. The amount of solvent in each of the test tubes in the racks is typically less than about 2 mL.

As with the purification of single compounds, the methods for purifying libraries of compounds involve equilibrating an HPLC column with a mobile phase that, when combined with a certain volume of the solvent used in the synthesis, results in a combined solvent system which has an appropriate polarity for use in purifying the compounds. That is, the void volume of the mobile phase used to equilibrate the column is sufficient to alter the polarity of the solvent used to synthesize the compounds. The compounds, and the corresponding impurities resulting from the synthesis, does not substantially elute until the combined solvent/void volume of mobile phase has eluted from the column. Then, a gradient solvent system can be used to elute the compounds of interest from the column.

In order to determine an appropriate set of conditions for a combinatorial library, one can perform route scouting on the library to determine which set of conditions described above is appropriate for allowing the solvent used to prepare the compound(s) to elute off the column in the void volume or shortly thereafter while the compound(s) of interest does not significantly elute off the column in the void volume or cause a blockage in the system.

Once appropriate conditions for purifying a library of compounds are worked out for a given preparative HPLC column, solvent system and flow rate, the library of compounds can be purified without having to change the purification parameters. This results in substantial time savings in the purification and characterization of libraries of compounds.

For a given column packing, solvent system, and flow rate, conditions can be worked out for virtually any solvent system used to prepare organic compounds. For example, using a TLC plate backed with a $C_{18}$ sorbent, and using 80% methanol/20% water as the solvent, a compound or series of compounds can be evaluated by TLC to determine the Rf of the compound(s).

One can readily determine a series of three or more, preferably four or more, zones of Rfs in which the majority of compounds in the library, or the representative sample from the library, will move on a TLC plate, for example, low, medium and high Rfs. These zones can be correlated to appropriate mobile phase compositions, flow rates, tubing sizes and sorbents for performing preparative or semi-preparative HPLCs.

The route scouting involves evaluating a representative sample of compounds from a library of compounds, such as a combinatorial or lead generation library, by TLC to determine which zone the compounds move on the TLC plate. A suitable sample size is typically on the order of between 2 and 10%, preferably between 4 and 5% of the library, depending on the diversity of the compounds in the library. The representative sample should encompass, if possible, the most polar and least polar compounds synthesized in the library, to help ensure that the method is applicable for the entire library. This approach is referred to herein as "route scouting," since one is scouting for an appropriate purification route.

Once the zone is identified, a correlated preparative HPLC sample preparation method is used for the entire library to elute the solvent used to prepare the compounds without eluting the compounds, and then a second correlated preparative HPLC solvent gradient method can optionally be used to purify the compounds.

Appropriate conditions for a library of compounds can be worked out by route scouting a representative sample of the library for a given TLC backing and solvent system. A correlated preparative HPLC method can be applied to the library of compounds without having to change the purification parameters, so that a single method can be applied to the entire library.

Preferably, preparative or semi-preparative HPLC is performed on a sample of compounds from the library before purifying the entire library. This allows one to verify that the conditions are suitable for purifying the entire library, for example, by determining the purity of the compounds in the representative sample. Also, one can perform a TLC on between 10 and 100%, preferably between 50 and 100% of the library and compare the TLC to that in the representative sample. By performing a TLC on the entire library and/or determining the purity of a representative sample of compounds, one can ensure that the majority of the library can be adequately purified. If the purity is not adequate on the representative sample, or if the TLC of the library does not sufficiently match that of the representative sample, alternative preparative HPLC conditions can be used.

The methods described herein result in substantial time savings in the purification and characterization of libraries of compounds, and can provide compounds with greater than 90% purity. Once appropriate conditions for purifying a library of compounds are worked out for a given preparative HPLC column, solvent system and flow rate, the library of compounds can be purified without having to change the purification parameters. This results in substantial time savings in the purification and characterization of libraries of compounds.

The present invention will be further understood with reference to the following non-limiting examples:

EXAMPLE 1

HPLC Equipment

To purify compounds using the methods described herein, one can use the following HPLC equipment. The auto-injector can be a Gilson 215 liquid handler with an 819 injection valve actuator. The fraction collector can be a Gilson 215 liquid handler. The gradient pumps can be Gilson pump 306 models with 50 SC pump heads. The dilution pumps can be Gilson 307 pumps with 1.5 SC pump heads. The equilibration pump can be a programmable HPLC Gilson pump 305 model with a 50 SC pump head. The mixer can be a Gilson 811 C dynamic mixer with an 806 Monometric model. The pressure monitor can be a Gilson 806 model pressure monitor. The HPLC detectors used can be a Gilson 170 model diode array detector with a MS detector Platform LC model from Micromass. The MS detector can contain a quadruple mass analyzer with atmospheric pressure ionization (API) source capable of using both atmospheric chemical ionization (APCI) and Megaflow electrospray ionization probes. The mass spectrometer can be equipped with a rotary pump and a transformer. The switching valves can be two Gilson valve mates. The splitter can be one 1/1000 ACURATE by LC packing and an Upchurch splitter. The data collection system can be a Digital Pentium II GL-2 computer, monitor and Hewlett Packard Laser Jet 6P printer that included Micromass Masslynx NT 3.1B6 work under Windows NT V. 4.0, OpenLynx Version™, FractionLynx™ and Gilson's Unipoint v. 1.64 software.

The tubing sizes for the system can be as follows:

Mixer to injector, injector to column, column to UV diode array detector and UV to splitter box can be Green Peek, Upchurch Scientific, INC 0.03" ID. Make-up pump to splitter box can be Green Peek, Upchurch Scientific, INC 0.01" ID. Splitter box to Upchurch splitter can be Green Peek, Upchurch Scientific, INC 0.007" ID. Upchurch splitter to waste can be Green Peek, Upchurch Scientific, INC 0.01" ID. Splitter to fraction collector can be 0.04" ID (Tubing Accurate/FC cat. No. PE-1000 FC).

The tubing sizes permit the use of a relatively high (up to 50 mL/min) flow rate with the purification method described herein. With the smaller tubing sizes typically found in conventional HPLC, it would be extremely difficult to achieve this high of a flow rate, and, accordingly, it would be extremely difficult to perform the purification method.

The apparatus described above has been successfully used to purify hundreds of compounds without first having to remove the solvents. The apparatus has been used with respect to the correlation between TLC and HPLC conditions shown below in Example 2.

EXAMPLE 2

Correlation between TLC and Preparative HPLC

TLC are performed using a 5 micron. Please delete the particle size for TLC plate. C18 particle backing on the TLC plates, and using 80% methanol, 20% water as the solvent. The compounds had an Rf in one of the following four zones: 1) Rf=0, 2) Rf=0.05–0.2, 3) Rf=0.2 to 0.8 and 4) Rf>0.8.

For each zone, the solvent used to condition the column (the initial mobile phase) was 95% water/5% methanol (v/v) (weak solvent). The sorbent was a C18 reverse phase with a 5 micron particle size. The tubing sizes and apparatus are as described above in Example 1. Using the mobile phase, tubing size and apparatus described above, the compound remained on the column and the solvent used to prepare the compound was preferentially eluted by adjusting the equilibration pump flow rate. The flow rate of weak solvent for equilibration pump was correlated with the zones described above as follows: Zone 1—flow rate=20 mL/min; Zone 2—flow rate=25 mL/min; Zone 3—flow rate=30 mL/min; Zone 4—flow rate=35 mL/min. These conditions can be varied, depending on the tubing sizes, column packing, mobile phase and other factors known to those of skill in the art. However, suitable conditions will be apparent to those of skill in the art using the teachings provided herein.

What is claimed is:

1. A method for preparing samples for HPLC purification of a library of compounds without having to remove a first solvent prior to placing compounds on a column, comprising:
   a) selecting a first mobile phase such that when the void volume of the mobile phase is combined with the amount of solvent in the vessel used to prepare the compound of interest, the resulting solvent system does not cause the compound of interest to significantly elute off of the column,
   b) conditioning the column with a selected mobile phase,
   c) applying the compound dissolved in the solvent used to prepare the compound to the column, and
   d) eluting the solvent used to prepare the compound of interest from the column.

2. The method of claim 1, further comprising applying a second mobile phase to the column to elute the organic compound from the column.

3. The method of claim 1, further comprising regeneration-washing the column after the compound of interest has eluted.

4. The method of claim 1, further comprising increasing the flow rate of the mobile phase relative to that used in a conventional HPLC such that the compound does not significantly elute off of the column in the void volume or cause a blockage in the HPLC system.

5. The method of claim 4, further comprising increasing the tubing size of the HPLC relative to that used in a conventional preparative HPLC to compensate for the increased column back pressure due to the increased flow rate.

6. The method of claim 1, further comprising decreasing the particle size of the sorbent relative to that used in a conventional preparative HPLC to slow down the elution of the compound of interest from the HPLC column.

7. The method of claim 6, further comprising increasing the tubing size of the HPLC relative to that used in a conventional preparative HPLC to compensate for the increased column back pressure due to the relatively small sorbent particle size.

8. The method of claim 1, further comprising performing route scouting on a representative sample of a library of compounds to determine appropriate conditions for eluting the solvent used to prepare the compounds from the HPLC column without significantly eluting the compounds of interest from the HPLC column.

* * * * *